June 30, 1931. R. PAXTON 1,812,754
CONTROL OF ELECTRORESPONSIVE DEVICES
Filed March 16, 1929

Inventor:
Robert Paxton,
by Charles E. Tullar
His Attorney.

Patented June 30, 1931

1,812,754

UNITED STATES PATENT OFFICE

ROBERT PAXTON, OF PHILADELPHIA, PENNSYLVANIA, ASSIGNOR TO GENERAL ELECTRIC COMPANY, A CORPORATION OF NEW YORK

CONTROL OF ELECTRORESPONSIVE DEVICES

Application filed March 16, 1929. Serial No. 347,684.

My invention relates to the control of electroresponsive devices, such as electroresponsive switch operating mechanisms or the like, and the principal object is to reduce the hazard of unexpected operation of such devices due to accidental closure of a supply circuit switch or the occurrence of faults in the supply lines.

While not limited thereto the improved control of the present invention is particularly adapted for controlling a motor operating mechanism of the centrifugal type such as described and claimed in the Walle Patents, 1,551,349 and 1,654,518. When such centrifugal operating mechanism is employed for closing large circuit breakers, or oil switches, the energizing circuit for the operating motor ordinarily is closed by means of an electromagnetic line switch under remote master switch control and the circuit is automatically opened when the closing operation is completed. With such an arrangement the electromagnetic line switch may be closed and the operating motor energized entirely independently of the master switch control, due to the negligence of a repairman or cleaning man in accidentally operating the line switch by hand or otherwise. Likewise where only a single pole line switch is provided, a ground fault in one side of the operating motor circuit may result in energization of the operating motor even though the line switch remains open. In either case, danger to life, or serious damage to the electric circuit and apparatus controlled by the circuit breaker or oil switch may result from such accidental and unexpected energization of the motor operating mechanism which closes the circuit breaker or oil switch.

The possibility of such accidental and unexpected energization of the motor operating mechanism is avoided in accordance with the present invention by providing an additional safety line switch which is connected so as jointly to cooperate with the usual line switch to establish the circuits thru which the operating motor is energized and which when opened serves to isolate the operating motor entirely from its supply circuit even tho the usual line switch should accidentally be closed or a ground fault should occur in the circuit.

Figure 1:
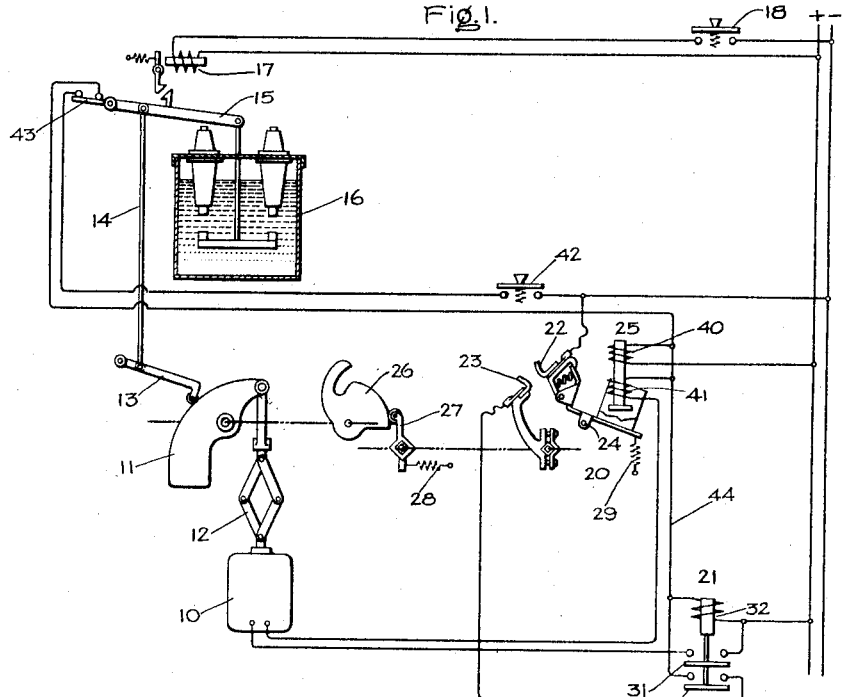
Figure 2:
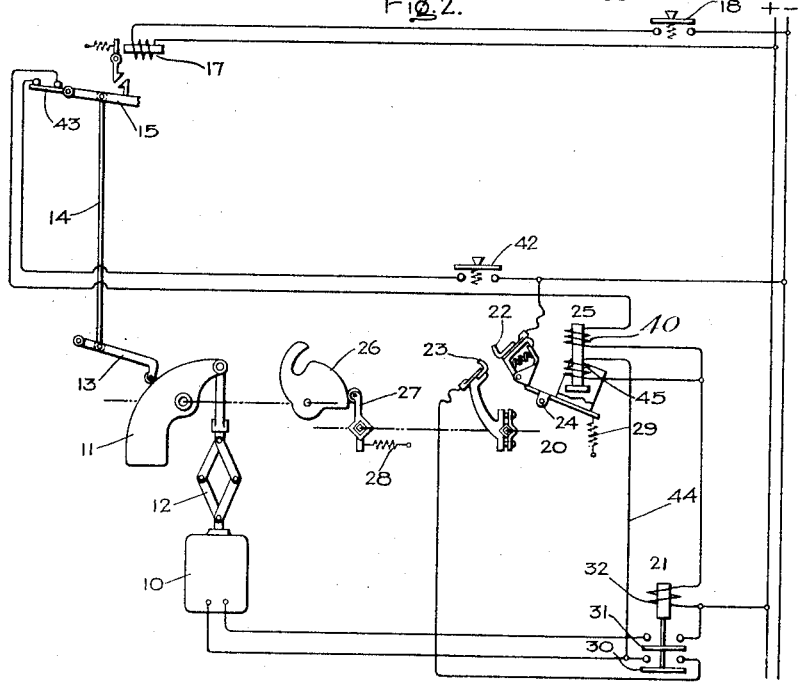

The manner of connecting and controlling the operation of the plurality of line switches for the motor operating mechanism will be understood from the following description of the accompanying drawings, in which Fig. 1 diagrammatically represents a centrifugal motor operating mechanism control system embodying a preferred form of the invention and Fig. 2 represents a modification thereof.

In the drawings the electric motor 10 is shown connected to operate the rotatively supported member 11 thru the agency of the centrifugal operating mechanism 12 which is of the form described in the previously mentioned Walle patents. The toggle arms of this mechanism are adapted to fly out upon rotation of the motor 10 and thereby rotates 11 in a clockwise direction. The member 11 is connected thru the agency of a shaft indicated in dash lines to the cam member 26 and through the arm 13 and the link 14 to the operating lever 15 of the oil switch 16. In this way the oil switch 16 is closed when the motor operated centrifugal mechanism rotates arm 11 and in accordance with the usual practice is arranged to be mechanically latched in the closed position when operated thereto. The opening of the oil switch 16 is effected by the latch tripping electromagnet 17 under the control of the master control switch 18. As the particular construction of the oil switch is not of the essence of the present invention no further description thereof is deemed necessary.

In accordance with the present invention the establishment of the energizing circuit from the supply lines + and − for the operating motor 10 is under the joint control of the two line switches 20 and 21. As shown the line switch 20 is of the type described and claimed in the copending application of Ludvig S. Walle, Serial #164,601 filed January 29, 1927, and assigned to the assignee of the present invention. This switch comprises the two co-operating contacts 22 and 23, each of which is independently movable with respect to the other. The contact 22 is operated about its pivotal support 24 by means of the electromagnet 25 into engagement with the contact 23, in order to establish the energizing circuit for the motor 10 in conjunction with switch 21. Upon completion of the operation of motor 10 required to close the oil switch 16, the contact 23 is operated out of engagement with the contact 22 by means of the cam member 26 which is connected with the rotatively mounted member 11 and the roller arm 27 which is connected with the contact 23. The cam and roller arrangement is such that when the oil switch is open the contact 23 is normally held in the position in which it is shown by the spring 28 which holds the roller arm 27 against the face of the cam 26. Likewise the contact 22 is normally maintained in the open position in which it is shown by means of the spring 29.

As shown the line switch 21 is of the double pole contactor type and the two contacts 30 and 31 thereof are connected in the energizing circuit of motor 10 so as to respectively isolate the motors independently of the operation of line switch 20.

Line switch 21 is normally biased to the open position in which it is shown and is operated in the closed position by the electromagnet 32.

The operating electromagnet 25 for the line switch 20 preferably is provided with two windings 40 and 41, the former being an operating winding and the latter being a holding winding. As shown the holding winding 41 is of the series type and is connected directly in the circuit with motor 10 so as to be energized by the motor current. The normally opened master switch 42 is provided for controlling the operation of the two line switches 20 and 21 to establish the energizing circuit for motor 10. As will appear more fully in the following description of the operation, holding circuits for the winding 41 on switch 20 and for the operating winding of electromagnet 32 of switch 21 are arranged that upon completion of the closing operation of motor 10 and the resulting separation of the contact 22 and 23, these holding circuits are deenergized to permit the switches to return to their normal position in which they are shown in the drawings.

The operation is as follows, closure of the master switch 42 establishes an energizing circuit for the operating winding 40 of line switch 20 and the operating winding of line switch 21. This circuit may be traced from the negative supply line thru the master switch 42, the auxiliary switch 43 on the oil circuit breaker 16 and thence in multiple thru the operating winding 40 and the winding of electromagnet 32 of the positive supply line. The inclusion of the auxiliary switch 43 in this circuit insures against operation of the line switches 20 and 21 unless the oil circuit breaker 16 is in the open position in which the auxiliary switch is closed. With the operating windings of line switches 20 and 21 thus energized, these switches operate to the closed position and the energizing circuit for motor 10 is established. The motor energizing circuit extends from the negative supply line thru the single pole line switch 20, the lower contact 30 of the double pole line switch 21, the holding winding 41, the motor 10 then thru the upper contact 31 to the positive supply line. Thereupon motor 10 starts and accelerates the centrifugal operating mechanism 12 which flies out and quickly effects rotation of the member 11 with resulting closure of the oil switch 16.

During the brief interval required for operation of the centrifugal operating mechanism to close the breaker, the line switch 20 will be held in the circuit closing position due to energization of the holding winding 41 by the motor circuit. Likewise a holding circuit is established for the operating electromagnet 32 of the line switch 21 thru the conductor 44. This circuit may be traced from the positive supply line directly thru the winding 32 and the connector 44 and thence thru the lower contact 30 of line switch 21 and the contacts of line switch 20 to the negative supply line. In this way the energizing circuit of motor 10 is automatically maintained even though the master control switch is released to return to its open position after momentary operation thereof.

Upon completion of the operation of the motor mechanism to close the oil circuit breaker, the cam 26 operates to disengage the contact 23 from the contact 22, thereby interrupting the motor circuit and the holding circuit for line switch 20 and at the same time deenergizing the holding circuit for the operating winding of the line switch 21. Thereupon each of the line switches 20 and 21 is returned to its initial position as shown in the drawings preparatory to a subsequent operation of motor 10 under the control of the master control switch 42.

If desired the series holding winding 41 for the single pole line switch 20 may be eliminated in order to avoid loss of voltage on the motor 10 and the shunt holding winding arrangement illustrated Fig. 2 employed. In this arrangement the shunt holding winding 45 for the line switch 20 is connected in series circuit with the operating winding of electro-magnet 32. Thus upon closure of the master control switch 42 both winding 40 and 45 of the single pole line switch 20 and the operating winding of the double pole line switch 21 are energized in a manner similar to that described in connection with Fig. 1. Likewise upon completion of the closing movement of the operating mechanism, the disengagement of the contact 23 from the cooperating contact 22 serves to simultaneously interrupt the holding circuit for holding winding 45 and the operating winding 32.

It will be apparent that with the arrangements just described, accidental closure of either the single pole line switch 20 or the double pole line switch 21 will not result in the operation of the motor 10 and the likelihood of simultaneous accidental closure of both the line switches is of course, very remote. Furthermore, with the double pole line switch 21 connected to entirely isolate the motor 10 from its energizing circuit when this line switch is in the open position, it is impossible for accidental operation of motor 10 to occur due to ground faults, or the like.

What I claim as new and desire to secure by Letters Patent of the United States is:

1. In combination, an electroresponsive device, a plurality of switches for jointly controlling the connection of the device to a supply source, each of said switches having electroresponsive closing means and one of said switches having means operated by the device for opening the same independently of said electroresponsive closing means, a master switch connected to control the energization of said closing means and connections through which the energization of said closing means is continued to maintain said switches closed independently of said master switch until operation of the device to open said one switch.

2. An electroresponsive switch operating control comprising an electric motor for closing the switch, a single pole line switch and a double pole line switch connected to jointly establish power connections for the motor with the double pole switch in each power connection, an electromagnet for closing the single pole switch, an electromagnet for closing the double pole switch, a master switch for energizing said electromagnets, holding circuit connections extending through said single pole line switch for maintaining said electromagnets energized independently of said master switch, and means effective upon a predetermined operation of the motor for mechanically opening the single pole switch and thereby interrupting said holding circuit connections.

3. In combination, an electroresponsive device, a plurality of electroresponsive switches for jointly controlling the connection of the device to a supply source, one of said switches having contacts in each supply connection, energizing means for controlling the closing of said switches, connections through which each switch upon closure thereof maintains the other switch closed, and means operated by the device for effecting the opening of one of said switches.

4. In combination, an electroresponsive device, a single pole switch, a multiple pole switch, electrical connections through which the said switches jointly control the connection of the device to a sppply source with the multiple pole switch connected in each supply connection, electroresponsive means for controlling the closing of said switches, connections through which each switch upon closure thereof controls the electroresponsive means for maintaining the other switch closed, and means operated by the device for controlling the opening of said switches independently of said connections.

5. In combination, an electroresponsive device, a plurality of electroresponsive switches for jointly controlling the connection of the device to a supply source, one of said switches having contacts in each supply connection, a master switch connected to control the energization of each of said switches, connections through which each switch upon closure thereof maintains the other switch energized independently of said master switch, and means operated by the device for controlling the deenergization of one of said switches.

6. In combination, a movable device, an electric motor, connections between the motor and the device requiring a predetermined operation of the motor to effect movement of the device, and means for controlling the energization of motor and effect movement of the device including a master switch, a plurality of electroresponsive switches controlled thereby for jointly establishing power connections for the motor, one of said switches having contacts in each power connection of the motor, holding circuit connections for each of said switches controlled by the other of said switches independently of said master switch, and means effective upon operation of the device for mechanically opening one of said switches and thereby interrupting the holding circuit connections of the other switch.

In witness whereof, I have hereunto set my hand this 13th day of March, 1929.

ROBERT PAXTON.